(12) United States Patent
Hung

(10) Patent No.: US 7,274,834 B2
(45) Date of Patent: Sep. 25, 2007

(54) SEARCHING DEVICE, SEARCHING METHOD AND PROGRAM

(75) Inventor: Po-Chieh Hung, Hachioji (JP)

(73) Assignee: Konica Minolta Holdings, Inc. (JP)

( * ) Notice: Subject to any disclaimer, the term of this patent is extended or adjusted under 35 U.S.C. 154(b) by 670 days.

(21) Appl. No.: 10/847,263

(22) Filed: May 17, 2004

(65) Prior Publication Data

US 2004/0236733 A1    Nov. 25, 2004

(30) Foreign Application Priority Data

May 21, 2003    (JP) .............................. 2003-143309

(51) Int. Cl.
*G06K 9/54* (2006.01)
*G06K 9/60* (2006.01)

(52) U.S. Cl. .................... 382/305; 382/173; 707/3; 707/7

(58) Field of Classification Search ................ 382/190, 382/103, 293, 209, 224, 305–306, 173; 358/403; 707/3, 5–7
See application file for complete search history.

(56) References Cited

U.S. PATENT DOCUMENTS

| | | | |
|---|---|---|---|
| 5,893,095 A * | 4/1999 | Jain et al. ....................... 707/6 |
| 6,400,853 B1 * | 6/2002 | Shiiyama .................... 382/305 |
| 6,718,075 B1 * | 4/2004 | Yamamoto .................. 382/305 |
| 6,748,398 B2 * | 6/2004 | Zhang et al. ............. 707/104.1 |
| 6,804,420 B2 * | 10/2004 | Uehara et al. .............. 382/305 |
| 6,865,302 B2 * | 3/2005 | Chang ........................ 382/305 |
| 7,062,083 B2 * | 6/2006 | Lim et al. ................... 382/164 |
| 7,099,860 B1 * | 8/2006 | Liu et al. ....................... 707/3 |
| 7,130,492 B2 * | 10/2006 | Yamamoto .................. 382/305 |
| 2002/0051576 A1 * | 5/2002 | Choi et al. .................. 382/218 |

FOREIGN PATENT DOCUMENTS

JP    2000-276484    *    6/2000

(Continued)

OTHER PUBLICATIONS

Long et al, "Fundamentals of Content-Basedimage Retrieval", Multimedia Information Retrieval and Management—Technological Fundamentals and Applications, D. D. Feng, W. C. Siu and H. J. Zhang (eds.), Springer-Verlag, New York, pp. 1-26, 2003.*

(Continued)

*Primary Examiner*—Joseph Mancuso
*Assistant Examiner*—Andrae Allison
(74) *Attorney, Agent, or Firm*—Cantor Colburn LLP

(57) ABSTRACT

A searching device includes: a storage section for storing target information; a display section for displaying target images; an instructing section for selecting a target-image among the displayed target images; and a narrowing-down controlling section for narrowing down the target information, and for displaying the target images corresponding to the narrowed-down target information, wherein the narrowing-down controlling section includes: a feature information calculating section for calculating feature information; a coordinate space setting section for setting a coordinate space based on the feature information; a target information coordinate identifying section for identifying a coordinate of target information; a narrowing-down section for narrowing down a scope of coordinate space; and a narrowed-down target information extracting section for extracting the target information within the scope, and the narrowing-down controlling section performs control to repeat the identifying, the narrowing down, and the extracting, at each time of selecting the target image.

11 Claims, 9 Drawing Sheets

FOREIGN PATENT DOCUMENTS

JP          2002-197117      * 12/2002

OTHER PUBLICATIONS

Su et al, "Relevance Feedback in Content-Based Image Retrieval: Bayesian Framework, Feature Subspaces, and Progressive Learning", IEEE Transactions on Image Processing, vol. 12, No. 8, Aug. 2003.*

Lu et al, "Joint Semantics and Feature Based Image Retrieval Using Relevance Feedback" IEEE Transactions on Multimedia, vol. 5, No. 3, Sep. 2003.*

Su et al, "Extraction of Feature Subspaces for Content-Based Retrieval Using Relevance Feedback", International Multimedia Conference; vol. 9 pp. 98-106, Year of Publication: 2001.*

* cited by examiner

SEARCHING DEVICE, SEARCHING METHOD AND PROGRAM

BACKGROUND OF THE INVENTION

1. Field of the Invention

This invention relates to a searching device, a searching method and a program for searching for a target such as an image, a text, a sound and the like.

2. Description of the Related Art

These days, known is a searching device capable of searching for a user-desired image within an image database such as an electronic album or the like in which a plurality of image data obtained with the use of a digital still camera or a scanner are stored.

Further, similarly, various data concerning a text or a sound and so forth are respectively stored in a database, and it is possible to search for data stored in each database with the searching device.

By the way, in an image searching device, as a method for searching for a desired image among a large number of images stored in an image database, known is a method of searching an image based on a similarity of the image (see Japanese Patent Application Publication (Unexamined) No. Tokukai 2000-276484. Hereinafter, it is referred to as Patent Document 1). Concretely, by repeating an instruction of selecting an image similar to a desired image among a plurality of images displayed on a display unit by an instructing unit such as a mouse or the like, an image having high similarity to the instructed image is continuously extracted in order to search for the desired image.

Further, as a method for searching for a desired image, proposed is an image searching device to which a method of searching for an image according to a keyword which is in advance added to each image is applied. This image searching device stores each image with a plurality of types of feature amount added in advance, and adjusts any two types of feature amount among the plurality of types of feature amount for searching for a certain number of similar images to be displayed in the display unit corresponding to XY coordinate space (see Japanese Patent Application Publication (Unexamined) No. Tokukai-Hei 8-249352. Hereinafter, it is referred to as Patent Document 2).

Here, in general, display area of the display unit is limited, and thereby the number of images to be displayed on the display unit is limited. Therefore, in the above-mentioned image searching device of the Patent Document 1 and the like, when one instructs to display a plurality of images similar to the image selected by an instruction with the instructing unit such as a mouse or the like, in the order of similarity within an screen of the display unit, there is a possibility of not displaying the user-desired image within the screen. Therefore, there are problems such as, taking a long time to find the desired image, losing sight of the desired image as repeating the instructions of selecting an image at the instructing unit, and so forth.

Further, the above-mentioned image searching device of the Patent Document 2 and the like are created for a certain object such as cloth texture, curtain texture and the like. Therefore, in the case of searching for a general photographic image or the like, it is difficult to select the feature amount making up each coordinate axis, so it is not realistic to apply the above-mentioned image searching method of the Patent Document 2 to the search of a photographic image or the like. Further, when the number of images to be searched for is increased, a problem emerges, such as an operation of adding a keyword to be the feature amount becoming complicated.

SUMMARY OF THE INVENTION

The present invention was made in view of the foregoing circumstances, and an object of the present invention is to provide a searching device, a searching method and a program capable of searching for a target efficiently without losing sight of the desired target.

An inventor of the present invention, in order to solve the above-mentioned problems, calculated the following equation (1) as a result of analyzing the possibility of a desired image being displayed on a display unit at the above-mentioned search for an image as a target:

$$1 - \left(1 - \frac{q^J \cdot N}{M}\right) = P_{th}$$

where each reference is defined in accordance with the following. $P_{th}$: possibility of being displayed, M: the number of images in an image database, N: the number of images to be displayed within one screen of the display unit, J: the number of times of instructing candidate images, and q: narrowing-down coefficient concerning narrowing-down rate of the displayed coordinate space.

According to the equation, if, for example, $P_{th}$ is set to 0.997 and N is set to 80, as shown in FIG. 11, as the narrowing-down coefficient q becomes larger (q=2, 3, 4, 5), the number of detectable images in the image database becomes exponentially larger. In other words, this indicates that, by repeating the instructing candidate images and the displaying images on the display unit, it is possible to find a desired image among a great number of images in the image database.

Thereby, it is necessary to take account of how to narrow down candidate images so as to include a user-desired image, within the image database.

In accordance with a first aspect of the present invention, a searching device comprises: a storage section for storing a plurality of pieces of target information concerning a target of a search; a display section capable of displaying first predetermined number of target images corresponding to each of first predetermined number of pieces of target information among the plurality of pieces of target information stored in the storage section; an instructing section for performing an instruction so as to select a certain target image among the first predetermined number of target images displayed on the display section; and a narrowing-down controlling section for performing control so as to narrow down the plurality of pieces of target information stored in the storage section to the first predetermined number of pieces of target information, and so as to display the first predetermined number of target images corresponding to the first predetermined number of pieces of narrowed-down target information, wherein the narrowing-down controlling section comprises: a feature information calculating section for calculating feature information of each target information, the feature information indicating feature of each target information; a coordinate space setting section for setting a predetermined coordinate space based on the feature information calculated by the feature information calculating section; a target information coordinate identifying section for identifying a coordinate of target information corresponding to the target image selected by the instructing section, within the predetermined coordinate space set by the coordinate space setting section; a narrowing-down section for narrowing down a scope of coordinate space within the predetermined coordinate space, the scope including the first predetermined number of pieces of target information corresponding to the first predetermined number of target images to be displayed on the display section; and a narrowed-down target information extracting section for extracting the first predetermined number of pieces of target information corresponding to the first predetermined number of target images to be displayed on the display section for a purpose of narrowing down, among pieces of target information existing within the narrowed-down scope, and the narrowing-down controlling section performs control so as to repeat the identifying the coordinate of the target information by the target information coordinate identifying section, the narrowing down the scope of coordinate space by the narrowing-down section, and the extracting the first predetermined number of pieces of target information by the narrowed-down target information extracting section, at each time that the target image corresponding to the target information is selected by the instructing section.

In accordance with a second aspect of the present invention, a searching method for searching for a target of a search by using a storage section for storing a plurality of pieces of target information concerning the target of the search, a display section capable of displaying first predetermined number of target images corresponding each of first predetermined number of pieces of target information among the plurality of pieces of target information stored in the storage section, and a searching device comprising an instructing section for performing an instruction so as to select a certain target image among the first predetermined number of target images displayed on the display section, comprises: calculating feature information of each target information, the feature information indicating feature of each target information; setting a predetermined coordinate space based on the feature information calculated by the feature information calculating section; identifying a coordinate of target information corresponding to the target image selected by the instructing section, within the predetermined coordinate space set by the coordinate space setting section; narrowing down a scope of coordinate space within the predetermined coordinate space, the scope including the first predetermined number of pieces of target information corresponding to the first predetermined number of target images to be displayed on the display section; extracting the first predetermined number of pieces of target information corresponding to the first predetermined number of target images to be displayed on the display section for a purpose of narrowing down, among pieces of target information existing within the narrowed-down scope, and repeating the identifying the coordinate of the target information, the narrowing down the scope of coordinate space and the extracting the first predetermined number of pieces of target information, at each time that the target image corresponding to the target information is selected by the instructing section, for displaying the first predetermined number of target images corresponding to the first predetermined number of pieces of target information by narrowing down the plurality of pieces of target information stored in the storage section to the first predetermined number of pieces of target information.

In accordance with a third aspect of the present invention, a program makes a searching device comprising a storage section for storing a plurality of pieces of target information concerning a target of a search, a display section capable of displaying first predetermined number of target images corresponding to each of first predetermined number of pieces of target information among the plurality of pieces of target information stored in the storage section, and an instructing section for performing an instruction so as to select a certain target image among the first predetermined number of target images displayed on the display section, execute: calculating feature information of each target information, the feature information indicating feature of each target information; setting a predetermined coordinate space based on the feature information calculated by the feature information calculating section; identifying a coordinate of target information corresponding to the target image selected by the instructing section, within the predetermined coordinate space set by the coordinate space setting section; narrowing down a scope of coordinate space within the predetermined coordinate space, the scope including the first predetermined number of pieces of target information corresponding to the first predetermined number of target images to be displayed on the display section; extracting the first predetermined number of pieces of target information corresponding to the first predetermined number of target images to be displayed on the display section for a purpose of narrowing down, among pieces of target information existing within the narrowed-down scope, and repeating the identifying the coordinate of the target information, the narrowing down the scope of coordinate space and the extracting the first predetermined number of pieces of target information, at each time that the target image corresponding to the target information is selected by the instructing section, for displaying the first predetermined number of target images corresponding to the first predetermined number of pieces of target information by narrowing down the plurality of pieces of target information stored in the storage section to the first predetermined number of pieces of target information.

Here, as the target of the search, an image such as a still image, a moving image and the like, a text, a sound and so forth can be cited, and a combination of at least two of the mentioned objects can be also cited.

Further, the target image is to fairly express the target of the search. For example, if the target is an image, a thumbnail image of each image can be cited, if the target is a text, a display image concerning a title of each text or the like can be cited, and if the target is a sound such as a music, a display image concerning a title of each music or the like can be cited.

According to the device of the first aspect, the method of the second aspect and the program of the third aspect of the present invention, at each time that a target image corresponding to certain target information is instructed by the instructing section, by repeating identifying a coordinate of the instructed target information, narrowing down a scope of coordinate space based on the identified coordinate of the target information, and extracting predetermined number of pieces of target information within the narrowed-down scope, it is possible to narrow down the plurality of pieces of target information stored in the storage section to desired target information. In other words, even if a plurality of pieces of target information having approximately the same feature information to each other are distributed within a certain area of the narrowed-down scope, these target information are not extracted unevenly, but the target information is extracted from all over the narrowed-down scope. Thereby, it is possible to narrow down to predetermined number of pieces of target information so as to have target information of a desired target included therein.

Further, since it is not necessary to add feature information such as a keyword or the like to each target information, even if the number of the targets of the search stored in the storage section is large, it is possible to search for the target easily.

Accordingly, it is possible to search for a target without losing sight of the desired target.

Preferably, in the device of the first aspect of the present invention, the narrowing-down section changes a size of the narrowed-down scope within the coordinate space based on a distance between a first coordinate of a first target information and a second coordinate of a second target information, the first coordinate being identified by the target information coordinate identifying section, the second coordinate being identified by the target information coordinate identifying section.

According to the above-mentioned device, since a size of the narrowed-down scope is changed based on a distance between a first coordinate of first target information identified by the target information coordinate identifying section, and a second coordinate of second target information identified by the target information coordinate identifying section, it is possible to search for a target efficiently. In other words, for example, the larger the distance between the first coordinate of the first image data and the second coordinate of the second image data is, the further from reaching to find the desired still image it is. Therefore, by narrowing down the scope of coordinate space so as to make the narrowed-down scope large, it is possible to reduce the possibility of losing sight of the desired still image.

Preferably, in the device of the first aspect of the present invention, the narrowing-down controlling section comprises: a coordinate space dividing section for dividing the narrowed-down scope into predetermined areas; and a target image selecting section for selecting a target image to be displayed on the display section, among target images corresponding to pieces of target information existing within each of the areas divided into by the coordinate space dividing section.

According to the above-mentioned device, by dividing the narrowed-down scope into predetermined areas, a target image is selected in each area to be displayed. Thereby, it is possible to narrow down target information efficiently without necessary information dropped, with the use of the divided areas.

Preferably, in the device of the first aspect of the present invention, the target image selecting section is structured so as to be capable of selecting one target image based on the feature information of each of the pieces of target information existing within each of the divided areas of the narrowed-down scope.

According to the above-mentioned device, since one target image is selected based on feature information of each target information existing in each area of the coordinate space, a plurality of target images corresponding to a plurality of pieces of target information having approximately the same feature information to each other are not displayed on the display section. Thereby, it is possible to search for target information efficiently. Further, it is possible to provide information concerning broad area within the coordinate space to a user without any necessary information lacked, and thereby it is possible to reduce the time for searching for a target.

Preferably, in the device of the first aspect of the present invention, the target image selecting section selects a plurality of target images based on the feature information of each of the pieces of target information existing within each of the divided areas of the narrowed-down scope, and the narrowing-down controlling section comprises a switching display controlling section for switching a display on the display section at each time that a predetermined period has passed so as to display the plurality of target images selected by the target image selecting section, on the display section.

According to the above-mentioned device, a plurality of target images are selected based on feature information of each target information existing within each area of the coordinate space, and the plurality of selected target images are displayed with the display switched at each time that a predetermined period has passed. Thereby, it is possible to display the plurality of target images without a size of displaying the target image. Therefore, it is possible to provide larger amount of information concerning each area to a user, and thereby it is possible to reduce the time for the image search.

Preferably, in the device of the first aspect of the present invention, the narrowing-down section sets an area as the narrowed-down scope by approximately centering the coordinate of the certain target information identified by the target information coordinate identifying section to the area, for narrowing down the plurality of pieces of target information at a predetermined rate, within the coordinate space.

According to the above-mentioned device, it is possible to narrow down a plurality of pieces of target information within the coordinate space at a predetermined rate with the use of the narrowed-down scope set with a coordinate of the target information as the center, the coordinate being identified by the target information coordinate identifying section.

Preferably, in the device of the first aspect of the present invention, the narrowing-down controlling section comprises: a recovery target information extracting section for extracting second predetermined number of piece of target information corresponding to second predetermined number of target image to be displayed on the display section for a purpose of recovery, among pieces of target information existing within the coordinate space excluding the narrowed-down scope narrowed down by the narrowing-down section; and a recovery target image display controlling section for displaying the second predetermined number of target image corresponding to the second predetermined number of piece of target information extracted by the recovery target information extracting section, on the display section.

According to the above-mentioned device, predetermined number of pieces of target information corresponding to target images are extracted to be displayed on the display section for a purpose of recovery, and the predetermined number of target images corresponding to these target information are displayed. Thereby, it is possible to search for a target more efficiently. In other words, even if target information which is apparently different from the desired target information and a target image which is apparently different from the target image corresponding to the desired target information is displayed on the display section, by instructing to select a target image corresponding to target information for the purpose of recovery, it is possible to change a range for narrowing down the target information largely, and thereby it is possible to reduce the possibility of losing sight of the target of the search.

Preferably, in the device of the first aspect of the present invention, the narrowing-down controlling section comprises: a similarity setting section for setting, according to a distance between a coordinate of each of the first predetermined number of pieces of extracted target information extracted by the narrowed-down target information extracting section and a coordinate of identified target information identified by the target information coordinate identifying section, within the coordinate space, a similarity of each of the first predetermined number of pieces of the extracted target information with respect to the identified target information; and a target image arranging section for arranging the first predetermined number of target images corresponding to the first predetermined number of pieces of target information, on the display section, based on the similarity set by the similarity setting section.

According to the above-mentioned device, similarity of extracted target information with respect to identified target information is set according to a distance between a coordinate of each of predetermined number of pieces of extracted target information extracted by the narrowed-down target information extracting section and a coordinate of the identified target information identified by the target information coordinate identifying section, and based on the similarity, target images corresponding to the predetermined number of pieces of target information are displayed on the display section. Thereby, it is possible to make the display of predetermined number of target images on the display section easy for a user to comprehend.

Preferably, in the device of the first aspect of the present invention, the target includes a still image, and the feature information includes color information of the still image and spatial frequency information of the still image.

According to the above-mentioned device, since the feature information includes color information and spatial frequency information of the still image, it is possible to appropriately search for the still image as a target with the use of the feature information.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein.

PREFERRED EMBODIMENT OF THE INVENTION

Hereinafter, a concrete embodiment of the present invention will be described with reference to figures. However, the range of the invention is not limited to illustrated examples.

Figure 1:
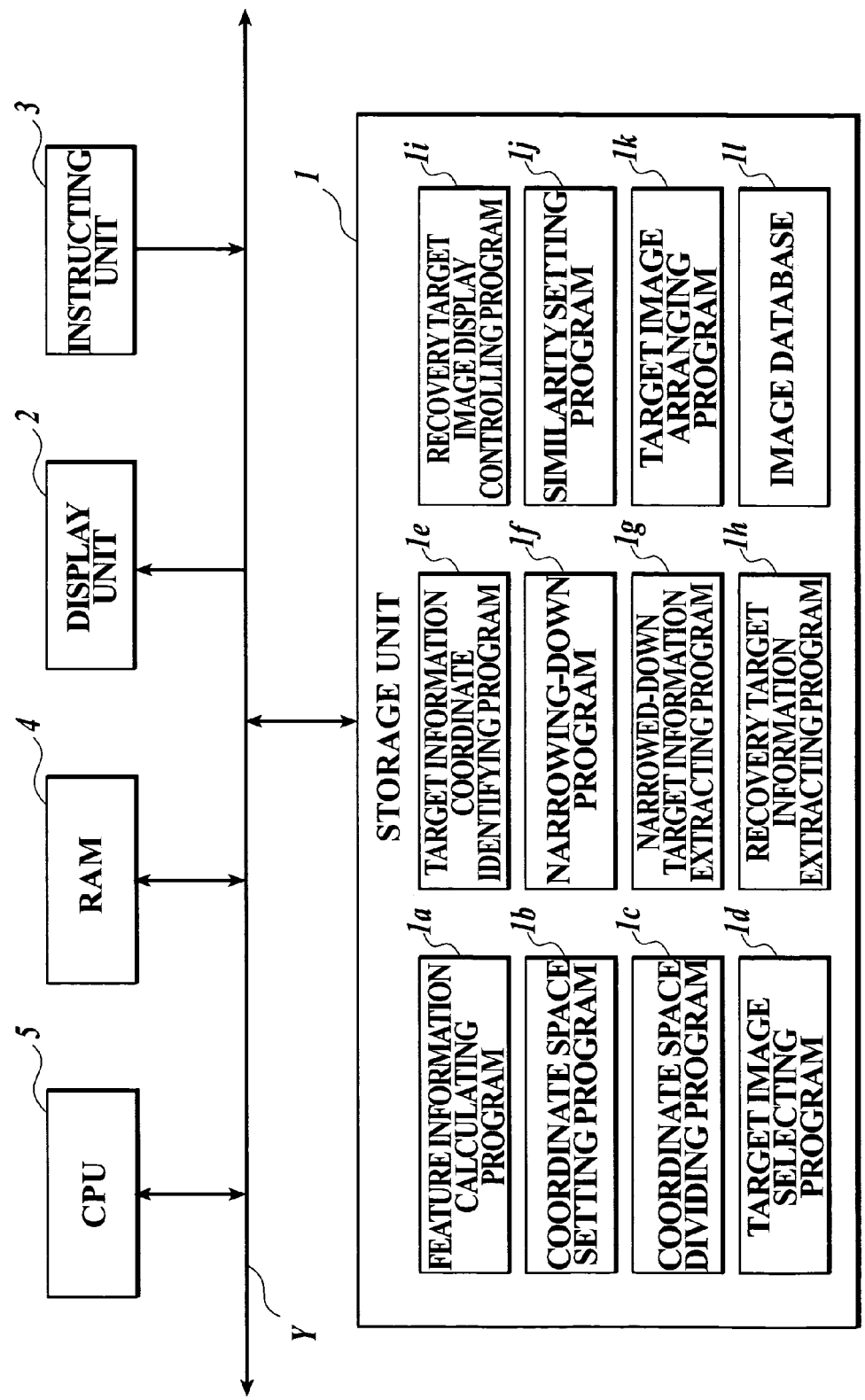
FIG. 1 is a block diagram showing a main structure of an image searching device illustrated as a suitable embodiment of a searching device to which the present invention is applied.

FIG. 1 is a block diagram showing a main structure of an image searching device illustrated as one suitable example of a searching device to which the present invention is applied, As shown in FIG. 1, the image searching device 100 comprises a storage unit 1, a display unit 2, an instructing unit 3, a RAM 4, a CPU 5 and the like. Each unit is connected through a bus Y.

The storage unit 1 is, for example, composed of a hard disk drive or the like, and stores programs regarding various types of functions executed by the CPU 5 as the image searching device 100, control data and the like. Concretely, the storage unit 1 stores a feature information calculating program 1a, a coordinate space setting program 1b, a coordinate space dividing program 1c, a target image selecting program 1d, a target information coordinate identifying program 1e, a narrowing-down program 1f, a narrowed-down target information extracting program 1g, a recovery target information extracting program 1h, a recovery target image display controlling program 1i, a similarity setting program 1j, a target image arranging program 1k and the like.

Further, the storage unit 1 stores an image database 11 in which image data (target information) of still images as targets of the search are contained.

The image database 11 contains the plurality of pieces of image data with the use of a directory structure.

Hereafter, the directory structure of the image database 11 will be described with reference to FIG. 2.

Figure 2:
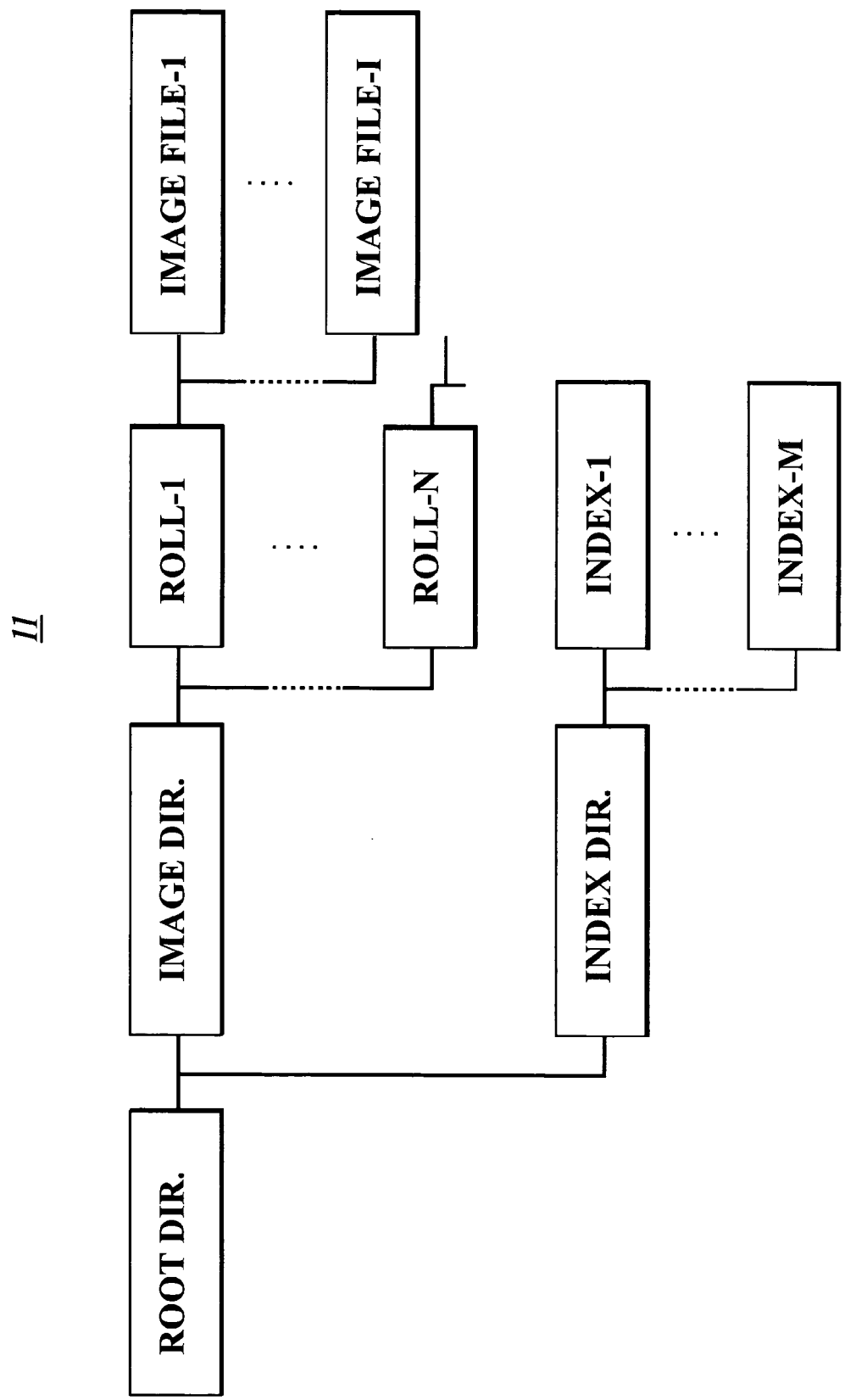
FIG. 2 is a view showing a directory structure of an image database stored in a storage unit included in the image searching device of FIG. 1.

As shown in FIG. 2, the image database stores directories such as "Image Dir.", "Index Dir." and the like that are hierarchically formed under "Rood Dir.". In "Image Dir.", stored are subdirectories such as "Roll-1", . . . , "Roll-n" and so forth, each storing image data such as "Image file-1", . . . , "Image file-l" and so forth. Here, each of "Roll-1", . . . , "Roll-n" is, for example, a directory in which image data concerning still images photographed by a predetermined digital camera or the like at approximately the same period. Thereby, they can be correspondent to a search for a still image with the use of time data, as feature data (feature information: it will be described later).

Further, in "Index Dir.", stored are index files such as "Index-1", . . . , "Index-m" and so forth, each being related to image data such as "Image file-1", . . . , "Image file-l" and so forth.

The display unit 2 is, for example, composed of an LCD (Liquid Crystal Display) or the like, and it displays a directory, a still image or the like based on a display control signal inputted through an output of the CPU 5. Further, the display unit 2, in an image searching process (will be described later), displays target images L1 to L5 (see FIG. 8) corresponding to each of the predetermined number of image data, among a plurality of image data stored in the storage unit 1.

Here, the target images L1 to L5 are to fairly express still images, such as thumbnail images of each still image or the like.

The instructing unit 3 is, for example, composed of a mouse or a keyboard, and by the instructing unit 3, an instruction of selecting a certain target image (for example, the target image L1) is made among the predetermined number of target images L1 to L5 displayed on the display unit 2.

The RAM (Random Access Memory) 4 is, for example, composed of a volatile semiconductor memory, and comprises an operation area for the CPU 5 and a storage area for temporarily storing various programs read from the storage unit 1, control data and the like, the various programs being executable in the image searching device 100.

The CPU (Central Processing Unit) 5 loads a program instructed among the various types of programs stored in the storage unit 1, develops the program into the operation area in the RAM 4, and executes various types of processes according to the program.

Concretely, the CPU 5 is capable of the image searching process for searching for desired image data among the plurality of image data stored in the storage unit 1, and in the image searching process, the CPU 5 performs a control, as a narrowing-down controlling section, so as to obtain the predetermined number of image data by narrowing down the plurality of image data to predetermined number of image data, and to display target images corresponding to the predetermined number of image data on the display unit 2.

Further, in the image searching process, the CPU 5, as a feature information calculating section, calculates feature data (feature information) which indicates feature of image data each stored in the storage unit 1 according to the feature information calculating program 1*a*.

Here, the feature data is preferably quantified so as to enable a user to visually distinguish differences among each still image. For example, the feature data comprises color data which indicates large color area of a still image, that is, color data concerning a color type indicating a peak in a color histogram of the still image, and spatial frequency data (spatial frequency information) concerning a peak value of a calculation result of spatial frequency distribution of brightness component of the still image, calculated with Fourier Transform or the like.

Further, the CPU 5, as a coordinate space setting section, sets a two-dimensional coordinate space S (see FIG. 3) composed of a coordinate axis corresponding to the color data and a coordinate axis corresponding to the spatial frequency data in a storing area of the RAM 4 based on the feature data, according to the coordinate space setting program 1*b*.

Further, the CPU 5 divides the coordinate space S into areas having a predetermined size according to the coordinate space dividing program 1*c*. As a method for dividing the coordinate space S, for example, a method of dividing the coordinate space S with a simple lattice set with predetermined intervals (see FIG. 4), and a method of dividing the coordinate space S so as to make each divided area include at least one image data (see FIG. 5) may be used. Here, in FIGS. 3 to 5 and FIG. 6 (will be described later), as being shown simply, black dots indicate image data, and among them, a circled black dot indicates a target image as a candidate image in each area. Further, in FIG. 5, illustrated is a case where adjacent areas are linked together (divided by a thick solid line) so as to have predetermined number (for example, 6) of divided areas.

Further, the CPU 5 selects target images as candidate images of a user-desired still image, to be displayed on the display unit 2, among target images corresponding to predetermined number of image data existing in each divided area of the coordinate space S, according to the target image selecting program 1*d*. Concretely, the CPU 5 selects one target image corresponding to image data located at approximately the center of each area based on feature data of each image data existing in each area of the coordinate space S.

Here, if there is no image data existing in an area, a selection of a target image is not made, or an area where a plurality of image data exist is further divided, or an area where there is not image data existing and an area where there is image data existing are linked together.

Further, the CPU 5, as a target information coordinate identifying section, identifies a coordinate in the coordinate space S, the coordinate of selected image data corresponding to a target image selected by the instructing unit 3, among the predetermined number of target images displayed on the display unit 2, according to the target information coordinate identifying program 1*e*.

Further, the CPU 5, as a narrowing-down section, narrows down the coordinate space S to a coordinate space for image selection S1 including image data corresponding to the predetermined number of target images to be displayed on the display unit 2 based on the coordinate of the selected image data in the coordinate space S, according to the narrowing-down program 1*f*. Concretely, the CPU 5 sets an area as the coordinate space for image selection S1 for narrowing down a plurality of image data at a predetermined rate (1/(narrowing-down coefficient q)), with the identified coordinate of the image data used as approximately the center.

Figure 6:
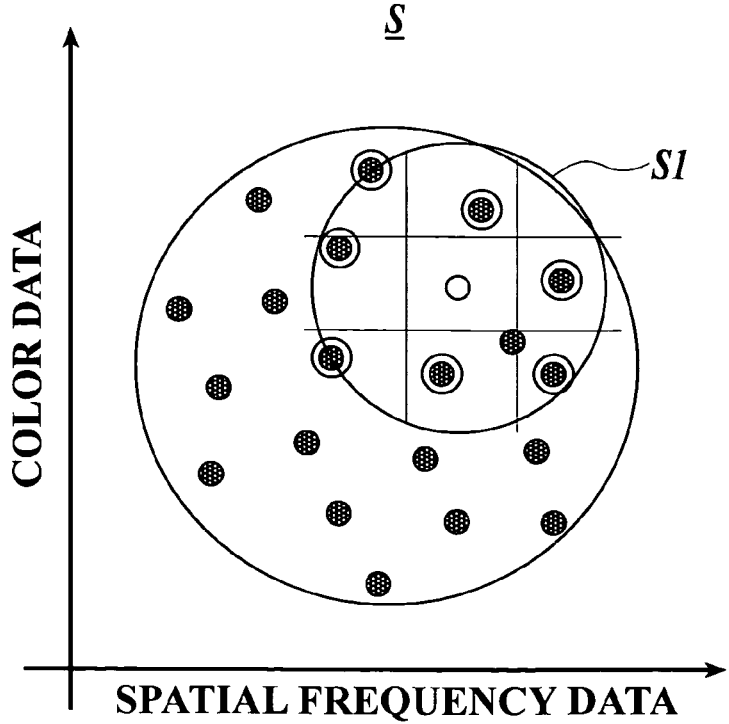
FIG. 6 is a pattern diagram showing a narrowed-down scope of coordinate space set within the coordinate space by the image searching device of FIG. 1.

FIG. 6 shows an example of the narrowing-down. First, a representative image (indicated by a white dot in FIG. 6) of a divided area is selected in the coordinate space S as selected image data by an instruction at the instructing unit 3 and a coordinate thereof is identified. Then, while the coordinate of the selected image data within the coordinate space S is defined as a center, the coordinate space S is narrowed down at a predetermined rate with respect to the center coordinate, to be set as a coordinate space for image selection S1. Then, the coordinate space for image selection S1 is re-divided into areas within the coordinate space S, and in each of the divided areas, a target image is selected as a candidate image to be displayed on the display unit 2 (indicated by a mark of a circled black dot in FIG. 6). Through the above-mentioned processes, display of the target images on the display unit 2 is updated, and the target image of the selected image data and the target images of candidate images in the divided area within the narrowed-down coordinate space for image selection S1 are displayed on the display unit 2.

Here, a size of the coordinate space for image selection S1, that is, a rate of narrowing down the image data is changeable based on a distance between a first coordinate of first image data identified by the CPU 5 as the target information coordinate identifying section, and a second coordinate of second image data identified by the CPU 5 as the same. Concretely, if the CPU 5 judges that the second coordinate of the second image data is near the first coordinate of the first image data, the size of the coordinate space for image selection S1 is set small, that is, the rate of narrowing down the image data is set large, and if the CPU 5 judges that the second coordinate of the second image data is far from the first coordinate of the first image data, the size of the coordinate space for image selection S1 is set large, that is, the rate of narrowing down the image data is set small.

In addition, the rate of narrowing down the image data may be changeable based on an user operation at the instructing unit 3 or the like. For example, after the start of image search is instructed, when a certain target image is selected for the first time among predetermined number of target images displayed on the display unit 2, a user may set a predetermined fixed value as the rate of narrowing down the image data. Here, the rate of narrowing down the image data is set from 1/5 to 1/2 in the case of narrowing down the image data to the most extent.

Further, the CPU 5, as a narrowed-down target information extracting section, extracts narrowed-down image data corresponding to predetermined number of target images to be displayed on the display unit 2 for the purpose of the narrowing down, according to the narrowed-down target information extracting program 1g.

Further, the CPU 5, as a coordinate space dividing section, divides the coordinate space for image selection S1 where predetermined number of extracted narrowed-down image data exists, into areas each having a predetermined size, and as a target image selecting section, selects one target image corresponding to narrowed-down image data located at approximately the center in each area, based on feature data of each narrowed-down image data existing in each area.

Further, the CPU 5 performs control so as to repeat identifying a coordinate of a certain image data in the coordinate space S, narrowing down the scope of coordinate space for image selection S1 and extracting predetermined number of narrowed-down image data, at each time that a target image corresponding to the certain image data is selected by the instructing unit 3.

Further, the CPU 5, as a recovery target information extracting section, extracts recovery image data corresponding to predetermined number of recovery target images to be displayed on the display unit 2 for the purpose of recovery, among image data existing in the coordinate space S excluding the coordinate space for image selection S1 narrowed down by the narrowing-down section from the coordinate space S, according to the recovery target information extracting program 1h.

Further, the CPU 5, as a recovery target image display controlling section, displays the predetermined number of recovery target images corresponding to the extracted recovery image data on the display unit 2, according to the recovery target image display controlling program 1i.

Further, the CPU 5, as a similarity setting section, sets similarity of the narrowed-down image data with respect to the selected image data in accordance with a distance between each coordinate of the predetermined number of extracted narrowed-down image data (extracted target information) and the identified coordinate of the selected image data (identified target information), according to the similarity setting program 1j.

Further, the CPU 5, as a target image arranging section, arranges target images corresponding to each of the selected image data and the predetermined number of narrowed-down image data based on the set similarity, according to the target image arranging program 1k.

Next, an image searching process executed under the control of CPU 5 will be described with reference to FIG. 7 and FIG. 8.

Figure 7:
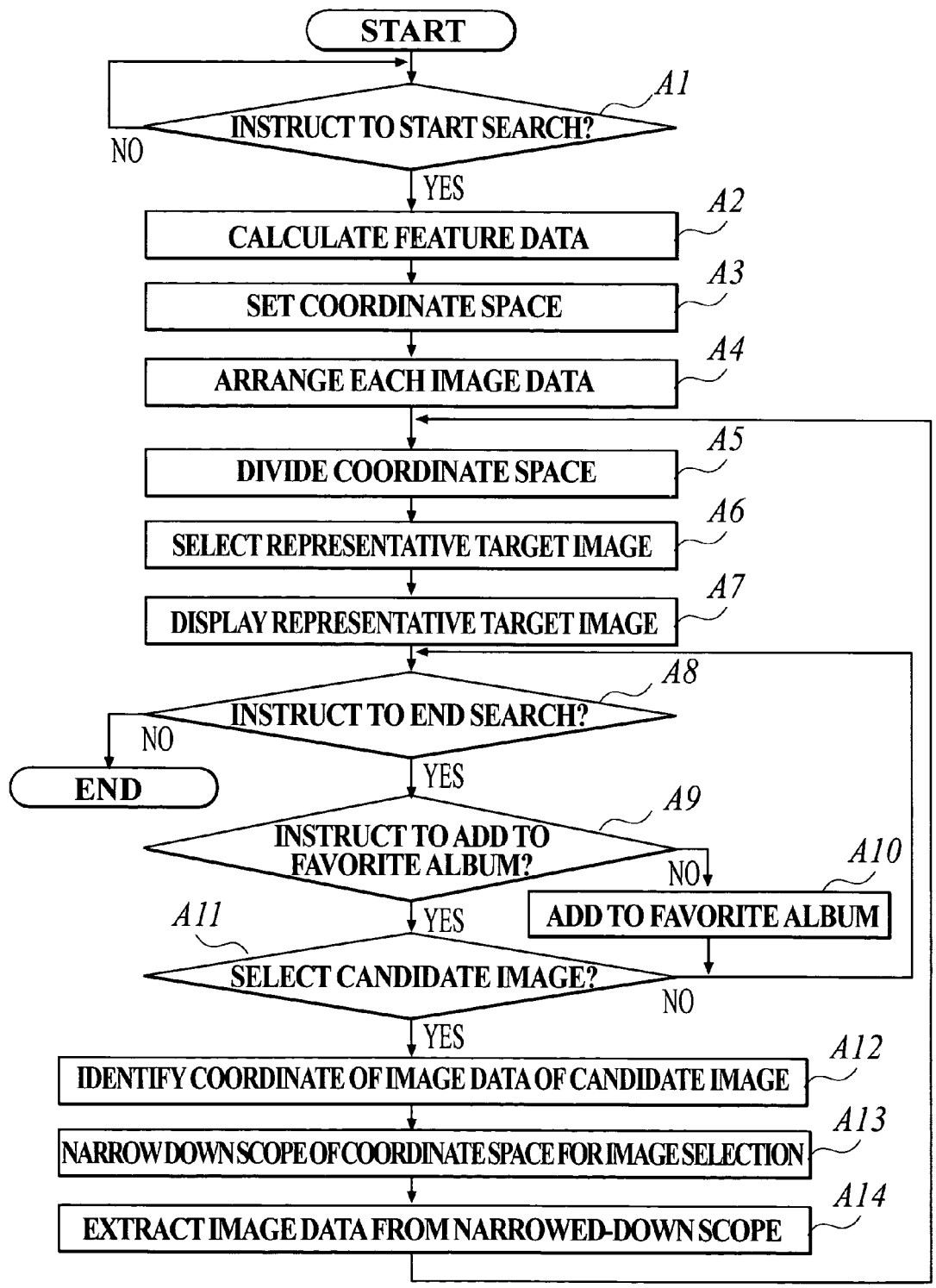
FIG. 7 is a flowchart illustrating an example of an operation concerning an image searching process by the image searching device of FIG. 1.
Figure 8:
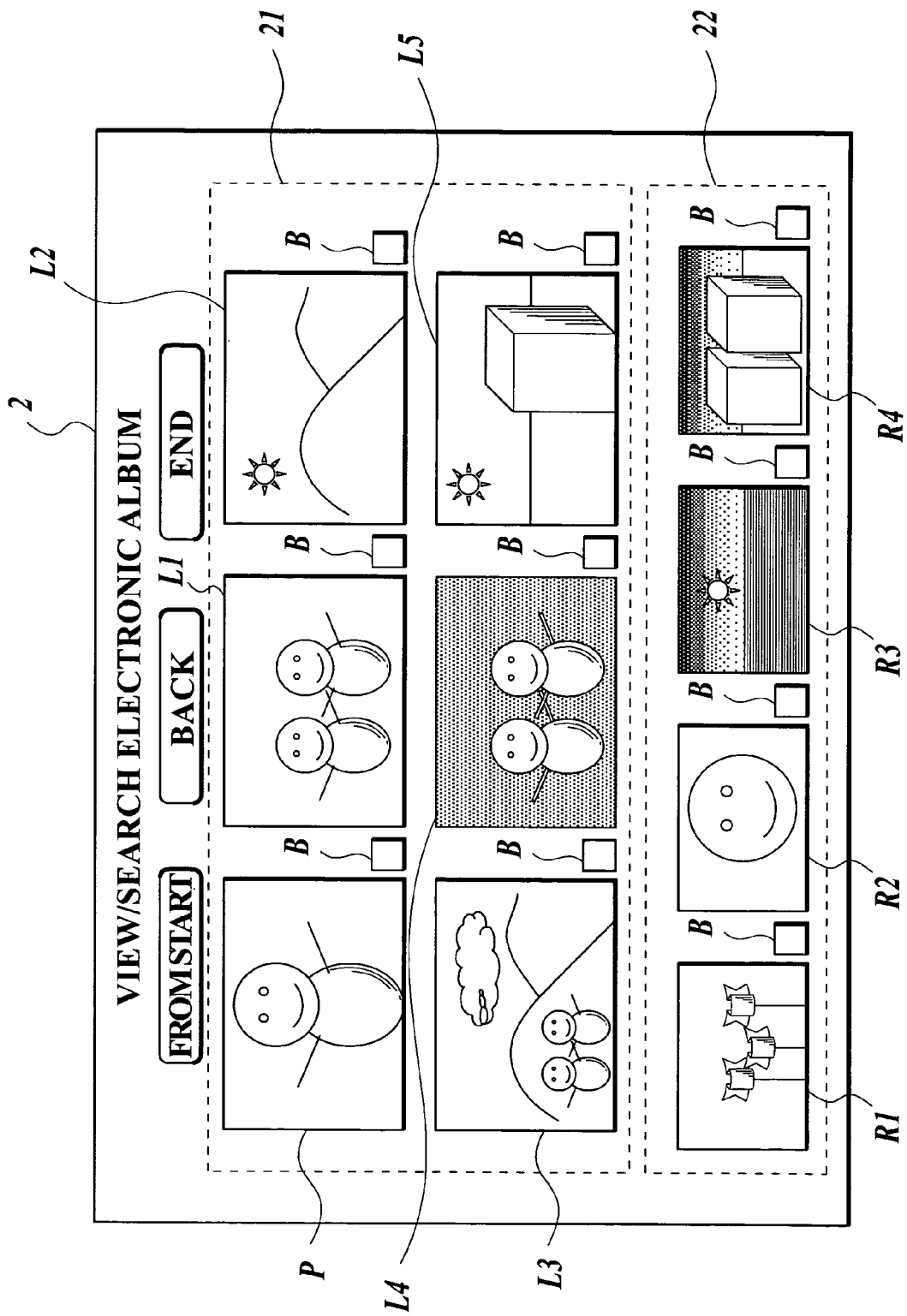
FIG. 8 is a view showing a concrete display example displayed on the display section in the image searching process of FIG. 7.

Here, FIG. 7 is a flowchart illustrating an example of an operation concerning the image searching process in the image searching device 100, and FIG. 8 is a concrete display example in the image searching process displayed on the display unit 2.

In the image searching process according to the present embodiment, it is assumed that, based on user's predetermined operation, a desired still image is searched for and the searched still image is added to "favorite album" (illustration omitted) in the image database 11 of the storage unit 1.

First, as shown in FIG. 7, for example, with a predetermined operation performed by a user, the start of searching for a desired still image is instructed (Step A1; Yes), the CPU 5 loads the feature information calculating program 1a from the storage unit 1 and develops it into the operation area of the RAM 4, and according to the feature information calculating program 1a, the CPU 5 calculates feature data of each of a plurality of image data stored in the image database 11 of the storage unit 1 (calculating feature information; Step A2).

Subsequently, the CPU 5 loads the coordinate space setting program 1b from the storage unit 1 and develops it into the operation area of the RAM 4, and according to the coordinate space setting program 1b, the CPU 5 sets in a predetermined area of a storing area of the RAM 4, a predetermined coordinate space S based on the feature data of each image data (setting a coordinate space; Step A3).

Figure 3:
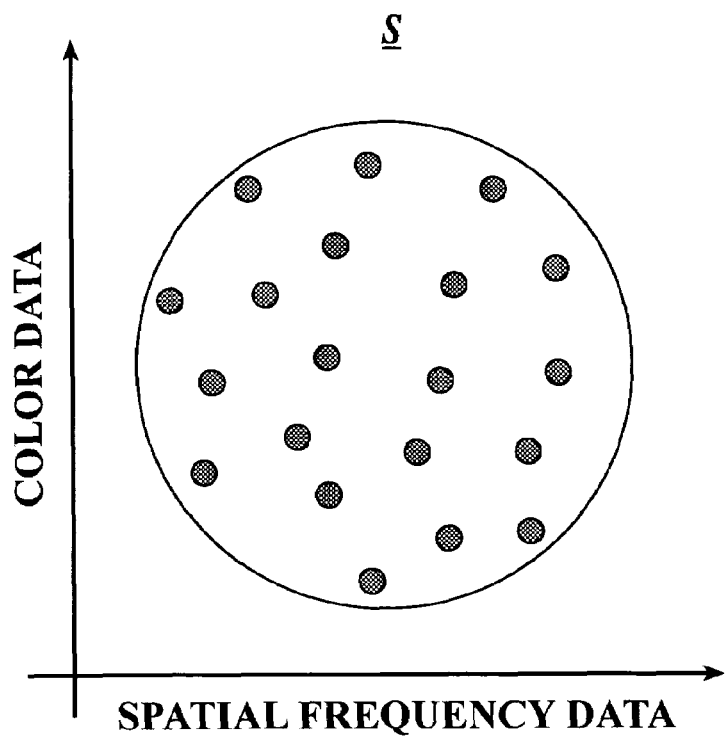
FIG. 3 is a pattern diagram showing a coordinate space set by the image searching device of FIG. 1, the coordinate space within which image data is arranged.

Thereafter, the CPU 5 arranges in the set coordinate space S, each image data based on the feature data (Step A4; see FIG. 3).

Figure 4:
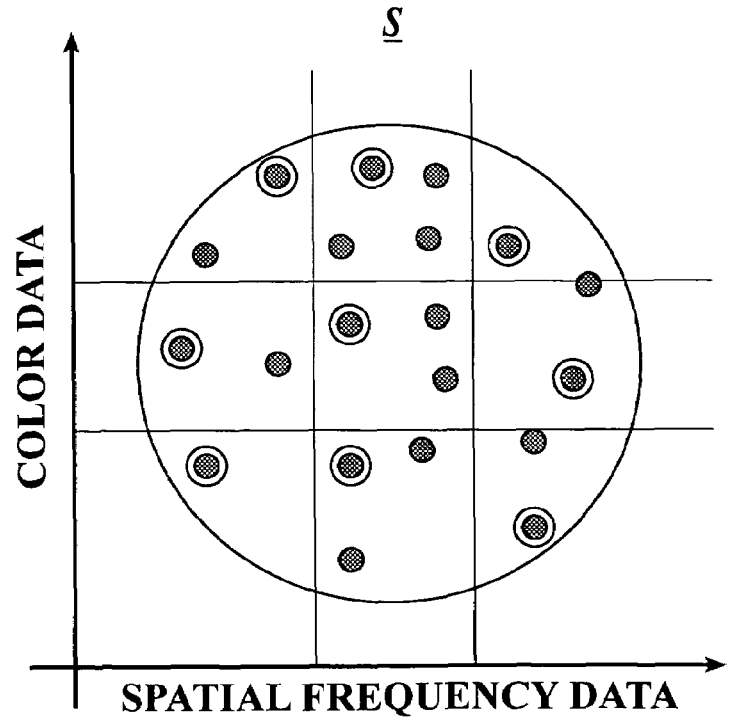
FIG. 4 is a pattern diagram showing a state where the coordinate space of FIG. 3 is divided.
Figure 5:
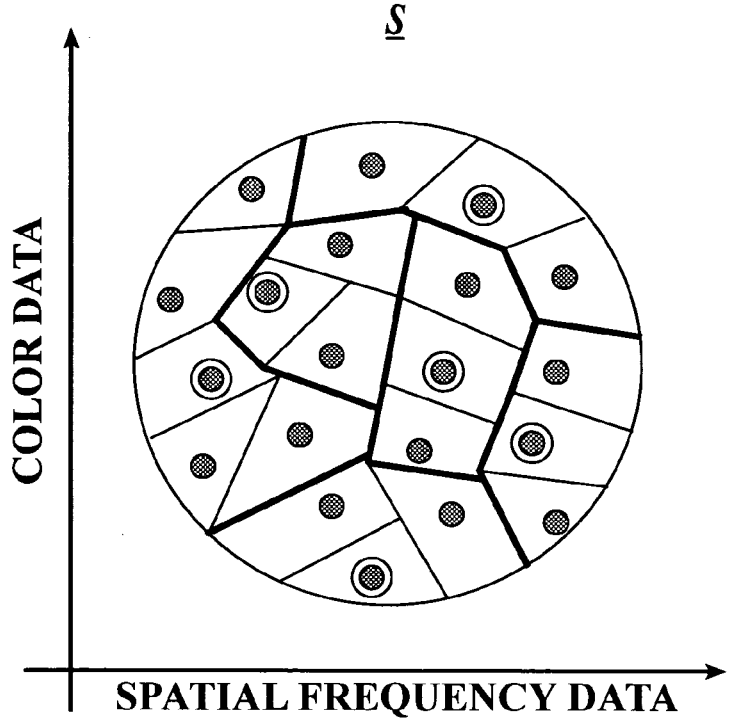
FIG. 5 is a pattern diagram showing a state where the coordinate space of FIG. 3 is divided, the state being different from that of FIG. 4.

Next, the CPU 5 loads the coordinate space dividing program 1c from the storage unit 1 and develops it into the operation area of the RAM 4, and according to the coordinate space dividing program 1c, the CPU 5 divides the set coordinate space S into areas having a predetermined size (Step A 5; see FIG. 4 and FIG. 5).

Then, the CPU 5 loads the target image selecting program 1d from the storage unit 1 and develops it into the operation area of the RAM 4, and according to the target image selecting program 1d, the CPU 5 selects a representative target image to be displayed on the display unit 2 among target images corresponding to image data existing in each area (Step A6), and displays the selected representative target images on the display unit 2 (Step A7).

Next, the CPU 5 judges whether an instruction to end searching for the desired still image has been inputted by the instructing unit 3 based on a user's predetermined operation (Step A8). Here, if the CPU 5 judges that the instruction to end searching for the desired still image has been inputted (Step A8; Yes), the CPU 5 ends the image searching process. On the contrary, if the CPU 5 judges that the instruction to end searching for the desired still image has not been inputted (step A8; No), subsequently the CPU 5 judges whether an instruction to add predetermined image data to "favorite album" has been inputted by the instructing unit 3 based on a user's predetermined operation (Step A9).

Here, if the CPU judges that the instruction to add the image data to "favorite album" has been inputted (Step A9; Yes), the CPU 5 controls the storage unit 1 so as to add the predetermined image data to "favorite album" (Step A10).

Then, the CPU 5 proceeds to Step A8, and controls the processes thereafter.

On the contrary, if the CPU 5 judges that the instruction to add the image data to "favorite album" has not been inputted (Step A9; No), the CPU 5 judges whether a candidate image of the desired image has been selected by the instructing unit 3 based on a user's predetermined operation, among the target images displayed on the display unit 2 (Step A11).

Here, if the CPU 5 judges that the candidate image has not been selected (Step A11; No), the CPU 5 proceeds to Step A8 and controls the processes thereafter.

Further, if the CPU 5 judges that the candidate image has been selected (Step A11; Yes), the CPU 5 loads the target information coordinate identifying program 1e from the storage unit 1 and develops it into the operation area of the RAM 4, and according to the target information coordinate identifying program 1e, the CPU 5 identifies a coordinate of the selected image data in the coordinate space S, corresponding to a selected target image P as the candidate image selected by the instructing unit 3 (identifying a coordinate of target information; Step A12).

Subsequently, the CPU 5 loads the narrowing-down program 1f from the storage unit 1 and develops it into the operation area of the RAM 4, and according to the narrowing-down program 1f, the CPU 5 narrows down the coordinate space for image selection S1 based on the coordinate of the selected image data within the coordinate space S (Step A13; narrowing down)

Next, the CPU 5 loads the narrowed-down target information extracting program 1g and develops it into the operation area of the RAM 4, and according to the narrowed-down target information extracting program 1g, the CPU 5 extracts image data corresponding to predetermined number of target images L1 to L5 to be displayed on the display unit 2 for the purpose of narrowing down, among image data existing within the coordinate space for image selection S1 (Step A14; extracting target information from narrowed-down scope). Subsequently, the CPU 5 proceeds to Step A5, and controls the processes thereafter. Concretely, the CPU 5, as the coordinate space dividing section, divides the coordinate space for image selection S1 where the predetermined number of extracted narrowed-down image data exists, into areas each having a predetermined size, and as the target image selecting section, selects one image such as the target image L1, corresponding to the narrowed-down image data located at approximately the center in each area based on each feature data of narrowed-down image data existing in each area, and displays the predetermined number of selected target images L1 to L5 on the display unit 2.

At this time, the CPU 5 loads the similarity setting program 1j from the storage unit 1 and develops it into the operation area of the RAM 4, and according to the similarity setting program 1j, the CPU 5 sets similarity of the narrowed-down image data with respect to the selected image data in accordance with a distance between each coordinate of the predetermined number of extracted narrowed-down image data and the identified coordinate of the selected image data. Subsequently, the CPU 5 loads the target image arranging program 1k from the storage unit 1 and develops it into the operation area of the RAM 4, and according to the target image arranging program 1k, the CPU 5 arranges the selected target image P corresponding to the selected image data and the target images L1 to L5 corresponding to the predetermined number of narrowed-down image data, based on the set similarity, on the display unit 2.

Further, the CPU 5 loads the recovery target information extracting program 1h from the storage unit 1 and develops it into the operation area of the RAM 4, and according to the recovery target information extracting program 1h, the CPU 5 extracts recovery image data corresponding to predetermined number of target images to be displayed on the display unit 2 for the purpose of recovery, among image data existing in the coordinate space S excluding the coordinate space for image selection S1. Then, the CPU 5 loads the recovery target image display controlling program 1i from the storage unit 1 and develops it into the operation area of the RAM 4, and according to the recovery target image display controlling program 1i, the CPU 5 displays a recovery target image corresponding to the recovery image data on the display unit 2.

Thereby, as shown in FIG. 8, in a narrowed-down target image displaying area 21 corresponding to an area occupying approximately ⅔ of the display unit 2, the area being located a bit higher than the center part of the display unit 2, displayed are the selected target image P corresponding to the selected image data, and the target images L1 to L5 corresponding to predetermined number (for example, 5) of narrowed down image data. In addition, in a recovery target image displaying area 22 corresponding to an area occupying approximately ¼ of the display unit 2, the area being located below the narrowed-down target image displaying area 21, displayed are recovery target images R1 to R4 corresponding to predetermined number (for example, 4) of recovery image data.

The narrowed-down target image displaying area 21 has, concretely, a two-layered structure composed of an upper displaying area and a lower displaying area, and three target images can be displayed on each of the upper displaying area and the lower displaying area. For example, at the left end of the upper displaying area, displayed is a selected target image P, at the center and the right end of the upper displaying area, displayed are two target images L1 and L2 respectively, and on the lower displaying area, displayed are the other three target images L3 to L5. Here, the arrangement of the five target images L1 to L5 is determined based on similarity of each narrowed-down image data corresponding to these target images L1 to L5, with respect to the selected image data. In other words, for example, the five target images L1 to L5 are displayed so as to arrange the images in the order of their similarity, at the center of the upper displaying area, at the right end of the upper displaying area, at the left end of the lower displaying area, at the center of the lower displaying area, and at the right end of the lower displaying area.

Here, beside each of the target images P, L1 to L5 and R1 to R4 displayed on the display unit 2, an instructing button B for instructing to select one of these images by the instructing unit 3 is displayed. For example, if a mouse is used as the instructing unit 3, a user performs the selecting instruction by pointing the instructing button B with a mouse cursor and clicking it.

Further, the above-described instruction to add the image data to "favorite album" may be implemented by pointing each displayed target image with the mouse cursor and clicking it so as to enable a user to instruct to add desired image data to "favorite album".

Then, at each time that a target image as a candidate image corresponding to certain image data is selected by the instructing unit 3, the CPU 5 proceeds to Step A5 and controls the processes thereafter. In other words, the CPU 5 performs control so as to repeat identifying a coordinate of the selected image data within the coordinate space for image selection S1, narrowing down the coordinate space for image selection S1, and extracting predetermined number of image data from the narrowed-down scope.

At this time, the CPU 5 performs control so as to change the size of the coordinate space for image selection S1 based on a distance between the first coordinate of the first image data identified by the target information coordinate identifying section, and the second coordinate of the second image data identified by the target information coordinate identifying section. Concretely, if the CPU 5 judges that the second coordinate of the second image data is near the first coordinate of the first image data, the CPU 5 performs control so as to set the size of the coordinate space for image selection S1 small, and if the CPU 5 judges that the second coordinate of the second image data is far from the first coordinate of the first image data, the CPU 5 performs control so as to set the size of the coordinate space for image selection S1 large.

Therefore, according to the present embodiment, with the selection of the candidate image repeated by a user, it is possible to find a desired still image with few times of selecting instruction.

Here, a time necessary for the image search in the present embodiment is shown as the equation below:

$$Tc = (N+L) \cdot J$$

where Tc: time necessary for image search, L: time necessary for identifying a plurality of target images displayed according to one time of user's instruction (loss).

Figure 9:
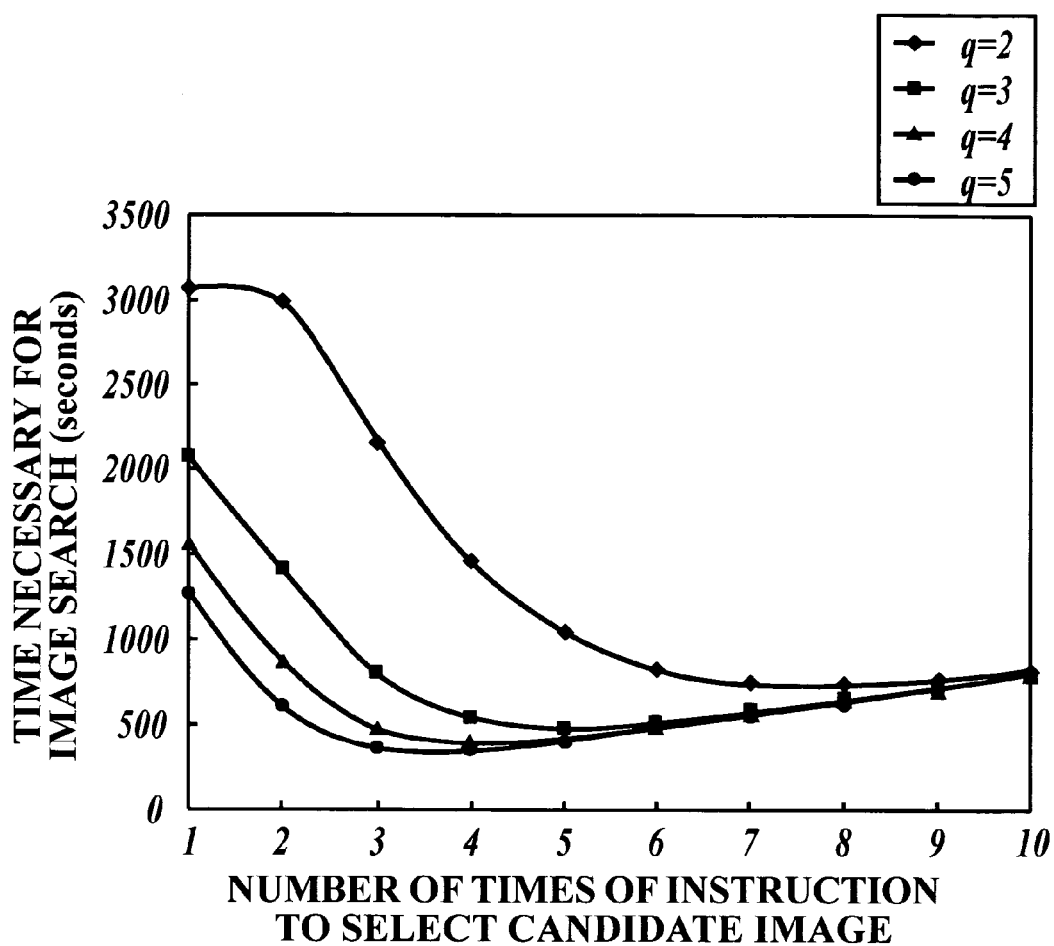
FIG. 9 is a view showing a relation between the time necessary for the image search and the number of times of instruction to select candidate images in the image searching process of FIG. 7.

According to the equation, if L=80 and M=6000, as shown in FIG. 9, by increasing the narrowing-down coefficient q (q=2, 3, 4, 5), it is possible to reduce the time necessary for the image search, and further, if the number of times of instruction to select candidate images is not more than 4, by increasing the number of times of selecting instruction, it is possible to reduce the time necessary for the image search.

As mentioned, according to the image searching device 100 in the present embodiment, at each time that a target image corresponding to certain image data is selected by the instructing unit 3, by repeating identifying a coordinate of the selected image data, narrowing down the coordinate space for image selection S1 based on the identified coordinate of the image data, and extracting predetermined number of image data within the coordinate space for image selection S1, it is possible to narrow down the plurality of image data stored in the storage unit 1 to desired image data. In other words, even if a plurality of image data having approximately the same feature data are unevenly distributed in a certain area of the coordinate space for image selection S1, the image data is not extracted unevenly, but the image data is extracted approximately all over the coordinate space for image selection S1. Thereby, it is possible to narrow down to predetermined number of image data so as to have image data of a desired still image included therein.

Further, since it is not necessary to add feature data of a keyword or the like to each image data, even if the number of still images stored in the storage unit 1 is large, it is possible to search for a still image easily.

Accordingly, it is possible to search for a desired still image without losing sight of it.

Further, since the coordinate space for image selection S1 is divided into areas each having a predetermined size and a target image is selected in each area to be displayed, it is possible to efficiently narrow down the image data with the use of the divided areas.

Further, since one target image is selected based on feature data of each image data existing in each area of the coordinate space S, a plurality of target images corresponding to image data having approximately the same feature data to each other are not displayed, and thereby it is possible to search for image data efficiently. Further, it is possible to provide information concerning a broad range within the coordinate space S to a user without anything necessary lacked in the information, and thereby it is possible to reduce the time for searching a still image even more.

Further, it is comprehended that, in the coordinate space S, the larger the distance between the first coordinate of the first image data identified by the image data coordinate identifying section and the second coordinate of the second image data identified by the same is, the further from reaching to find the desired still image it is. Therefore, by narrowing down the scope of the coordinate space for image selection S1 so as to make the coordinate space for image selection S1 large, it is possible to reduce the possibility of losing sight of the desired still image even more.

In addition, since image data corresponding to four target images to be displayed on the display unit 2 for the purpose of recovery are extracted and the four target images corresponding to these image data are displayed, it is possible to search for a still image efficiently. In other words, even if a target image which is apparently different from a target image corresponding to desired image data is displayed on the display unit 2, by instructing to select a target image corresponding to image data for recovery, it is possible to change a range for narrowing down image data largely. Thereby, it is possible to reduce the possibility of losing sight of the desired still image even more.

Further, similarity of narrowed-down image data with respect to selected image data is set according to a distance between each coordinate of the predetermined number of extracted image data and a coordinate of the selected image data. Further, based on the similarity, an selected target image P corresponding to the selected image data and narrowed-down target images L1 to L5 corresponding to five pieces of narrowed-down image data are arranged on the display unit 2. Thereby, it is possible to make the display of the selected target image P and the narrowed-down target images L1 to L5 on the display unit 2 easy for a user to comprehend.

Here, the present invention is not limited to the above-mentioned embodiment, and various types of modifications and changes of design may be applied without departing the gist of the present invention.

For example, in the above-mentioned embodiment, one target image (for example, a target image L1) is selected based on feature data of each image data existing in each divided area of the coordinate space S. However, the present invention is not limited to the above-mentioned embodiment, and a plurality of target images may be selected as images to be displayed. In other words, by making the CPU 5 function as a switching display controlling section for switching a display on the display unit at each time that a predetermined period has passed, so as to display the plurality of selected target images, according to a switching display controlling program (illustration omitted) stored in the storage unit 1, generally it is possible to display the plurality of target images on the display unit 2 having limited display-capable area without reducing a size for displaying the target image. Therefore, it is possible to provide larger amount of information concerning each area to a user, and thereby it is possible to reduce the time for the image search. Further, if time data is used as the feature data, still images which are photographed at approximately the same period are displayed with the display switched, it is possible to estimate a period of radiographing the images easily.

Figure 10:
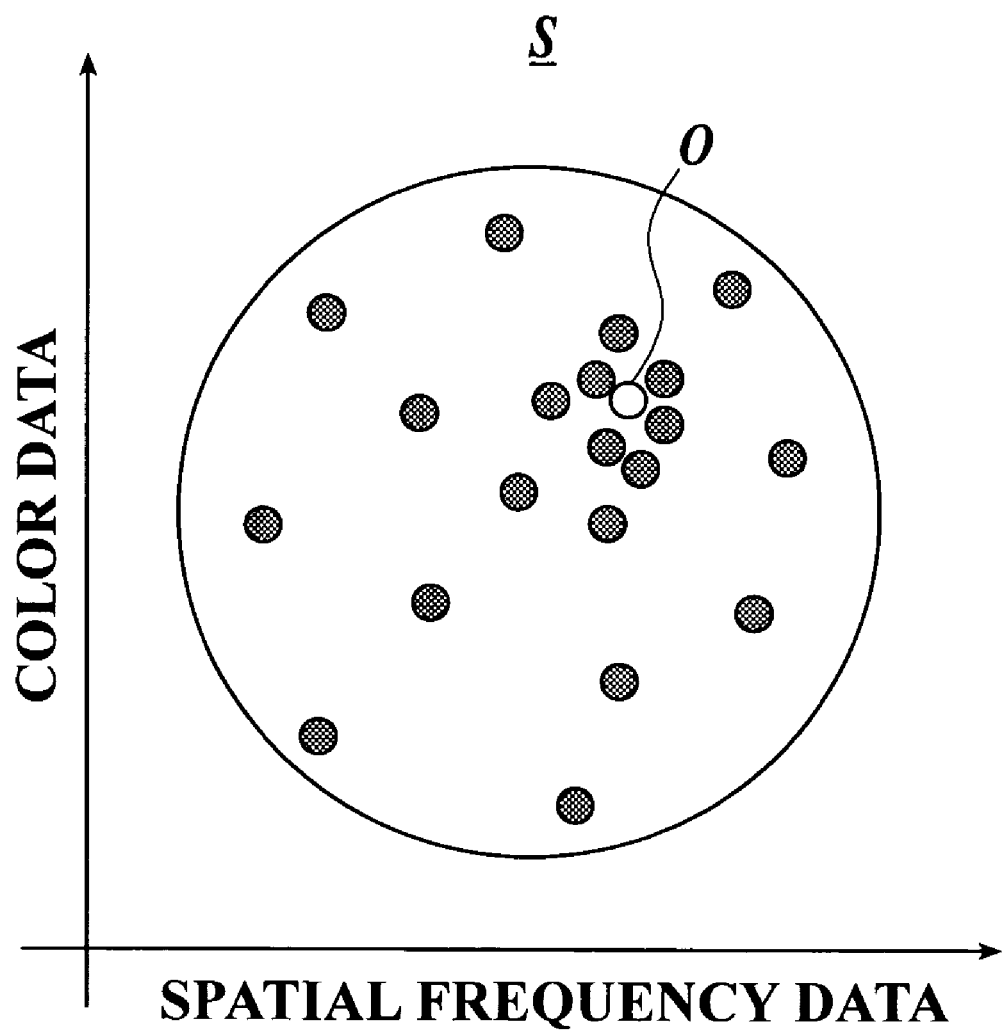
FIG. 10 is a pattern diagram showing a coordinate space set by the image searching device of FIG. 1, the coordinate space within which image data is arranged and different from that of FIG. 3.
Figure 11:
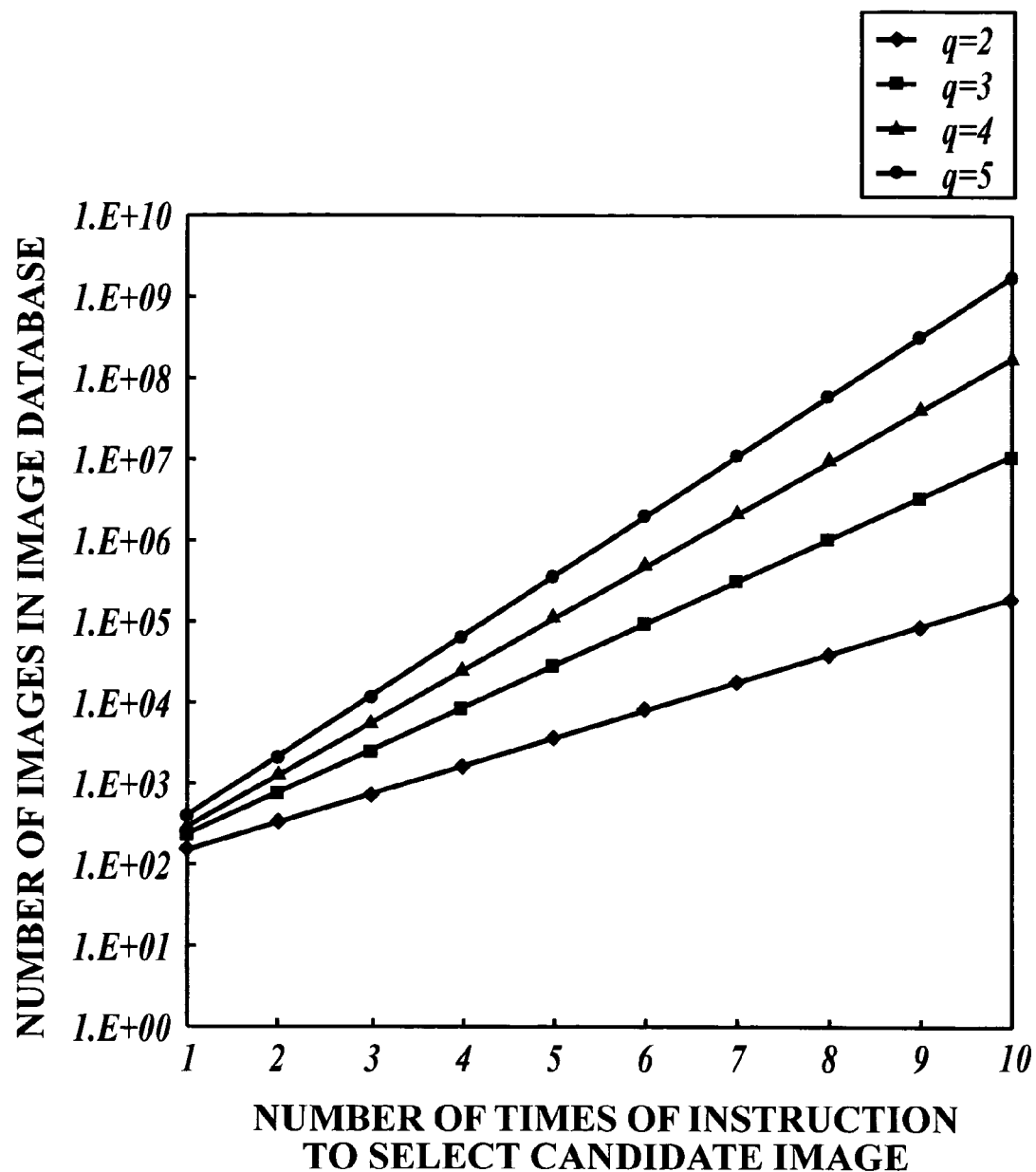
FIG. 11 is a view showing a relation between the number of images in the image database and the number of times of instruction to select candidate images.

Further, in the above-mentioned embodiment, at the time of displaying candidate images, the coordinate space S is divided into areas having a predetermined size and a predetermined target image is selected from each divided area to be displayed. However, the present invention is not limited to the above-mentioned example. For example, as shown in FIG. 10, the coordinate space S is not divided into predetermined areas, but a selection instructing point O is randomly and temporarily set, the selection instructing point concerning a selection of image data corresponding to a target image to be displayed on the display unit 2, and predetermined number of image data near the set selection instructing point O is selected to be displayed on the display unit 2.

Further, in the above-mentioned embodiment, as the coordinate space for image selection S1, an area is set with a coordinate of image data identified by the target information coordinate identifying section used as approximately the center thereof. However, the present invention is not limited to the above-mentioned example. Such area may be in any shape as long as the area is capable of including the image data corresponding to the target image to be displayed on the display unit 2.

In addition, in the above-mentioned embodiment, at the time of selecting target images P (L1 to L5, R1 to R4) displayed on the display unit 2 by the instructing unit 3, the instructing button B beside each target image is used. However, the present invention is not limited to the above-mentioned example. Selection of each target image may be directly instructed with the use of a pointer (illustration omitted) or the like, which is displayed on the display unit 2 and moves based on user's predetermined operation. In this case, for example, if a portion of a person's face is instructed as a target image with the pointer, based on image data corresponding to the portion of the face, the CPU 5 calculates feature data, and reset the coordinate space based on the calculated feature data. Thereafter, the CPU 5 extracts image data within a narrowed-down coordinate space for image selection, and displays target images of the extracted image data on the display unit 2.

Here, in this case, preferably whether to identify a portion of a target image selected with the pointer is optionally changeable based on an user's predetermined operation.

Further, in the above-mentioned embodiment, a still image is illustrated as a target of the search. However, the present invention is not limited to the above-mentioned example. For example, the target may be a moving image, a text, a sound and the like. Further, in this case, preferably feature data of target information such as moving image data, text data, sound data and the like is quantified so as to enable a user to distinguish differences among each target. For example, if the target is a moving image, data concerning velocity of subject movement and the like can be cited as the feature data. If the target is a text, data concerning continuity of the text, amount of the text and the like can be cited as the feature data. If the target is a sound, melody association degree, a type of instrument, voice and the like can be cited as the feature data.

Further, in the above-mentioned embodiment, as the feature data, color data and spatial frequency data are used. However, the present invention is not limited to the above-mentioned embodiment, and any type of information may be used as the feature data as long as the information is capable of indicating feature of each image data. In other words, for example, as the feature data, subject data concerning number of people of the subject and saturation data concerning saturation of an image may be used. Further, the coordinate space S may be structured three or four-dimensionally with the subject data and/or the saturation data added to the color data and the spatial frequency data.

In addition, in the above-mentioned embodiment, number of the hard disk drive composing the storage unit 1 may be one or plural, or the hard disk drive may be connected through a predetermined network.

The entire disclosure of Japanese Patent Applications No. Tokugan 2003-143309 filed on May 21, 2003 and No. Tokugan 2004-117947 filed on Apr. 13, 2004 including specifications, claims, drawings and summaries are incorporated herein by reference in their entirety.

What is claimed is:

1. A searching device comprising:
a storage section for storing a plurality of pieces of target information concerning a target of a search;
a display section capable of displaying first predetermined number of target images corresponding to each of first predetermined number of pieces of target information among the plurality of pieces of target information stored in the storage section;
an instructing section for performing an instruction so as to select a certain target image among the first predetermined number of target images displayed on the display section; and
a narrowing-down controlling section for performing control so as to narrow down the plurality of pieces of target information stored in the storage section to the first predetermined number of pieces of target information, and so as to display the first predetermined number of target images corresponding to the first predetermined number of pieces of narrowed-down target information,
wherein the narrowing-down controlling section comprises:
a feature information calculating section for calculating feature information of each target information, the feature information indicating feature of each target information;
a coordinate space setting section for setting a predetermined coordinate space based on the feature information calculated by the feature information calculating section;
a target information coordinate identifying section for identifying a coordinate of target information corresponding to the target image selected by the instructing section, within the predetermined coordinate space set by the coordinate space setting section;
a narrowing-down section for narrowing down a scope of coordinate space within the predetermined coordinate space, the scope including the first predetermined number of pieces of target information corresponding to the first predetermined number of target images to be displayed on the display section; and
a narrowed-down target information extracting section for extracting the first predetermined number of pieces of target information corresponding to the first predetermined number of target images to be displayed on the display section for a purpose of narrowing down, among pieces of target information existing within the narrowed-down scope, and
the narrowing-down controlling section performs control so as to repeat the identifying the coordinate of the target information by the target information coordinate identifying section, the narrowing down the scope of coordinate space by the narrowing-down section, and the extracting the first predetermined number of pieces of target information by the narrowed-down target information extracting section, at each time that the target image corresponding to the target information is selected by the instructing section.

2. The device of claim 1, wherein
the narrowing-down section changes a size of the narrowed-down scope within the coordinate space based on a distance between a first coordinate of a first target information and a second coordinate of a second target information, the first coordinate being identified by the target information coordinate identifying section, the second coordinate being identified by the target information coordinate identifying section.

3. The device of claim 1, wherein the narrowing-down controlling section comprises:
a coordinate space dividing section for dividing the narrowed-down scope into predetermined areas; and
a target image selecting section for selecting a target image to be displayed on the display section, among target images corresponding to pieces of target information existing within each of the areas divided into by the coordinate space dividing section.

4. The device of claim 3, wherein the target image selecting section is structured so as to be capable of selecting one target image based on the feature information of each of the pieces of target information existing within each of the divided areas of the narrowed-down scope.

5. The device of claim 3, wherein
the target image selecting section selects a plurality of target images based on the feature information of each of the pieces of target information existing within each of the divided areas of the narrowed-down scope, and
the narrowing-down controlling section comprises a switching display controlling section for switching a display on the display section at each time that a predetermined period has passed so as to display the plurality of target images selected by the target image selecting section, on the display section.

6. The device of claim 1, wherein the narrowing-down section sets an area as the narrowed-down scope by approximately centering the coordinate of the certain target information identified by the target information coordinate identifying section to the area, for narrowing down the plurality of pieces of target information at a predetermined rate, within the coordinate space.

7. The device of claim 1, wherein the narrowing-down controlling section comprises:
a recovery target information extracting section for extracting second predetermined number of piece of target information corresponding to second predetermined number of target image to be displayed on the display section for a purpose of recovery, among pieces of target information existing within the coordinate space excluding the scope narrowed down by the narrowing-down section; and
a recovery target image display controlling section for displaying the second predetermined number of target image corresponding to the second predetermined number of piece of target information extracted by the recovery target information extracting section, on the display section.

8. The device of claim 1, wherein the narrowing-down controlling section comprises:
a similarity setting section for setting, according to a distance between a coordinate of each of the first predetermined number of pieces of extracted target information extracted by the narrowed-down target information extracting section and a coordinate of identified target information identified by the target information coordinate identifying section, within the coordinate space, a similarity of each of the first predetermined number of pieces of the extracted target information with respect to the identified target information; and
a target image arranging section for arranging the first predetermined number of target images corresponding to the first predetermined number of pieces of target information, on the display section, based on the similarity set by the similarity setting section.

9. The device of claim 1, wherein
the target includes a still image, and
the feature information includes color information of the still image and spatial frequency information of the still image.

10. A searching method for searching for a target of a search by using a storage section for storing a plurality of pieces of target information concerning the target of the search, a display section capable of displaying first predetermined number of target images corresponding each of first predetermined number of pieces of target information among the plurality of pieces of target information stored in the storage section, and a searching device comprising an instructing section for performing an instruction so as to select a certain target image among the first predetermined number of target images displayed on the display section, the method comprising:
calculating feature information of each target information, the feature information indicating feature of each target information;
setting a predetermined coordinate space based on the feature information calculated by the feature information calculating section;
identifying a coordinate of target information corresponding to the target image selected by the instructing section, within the predetermined coordinate space set by the coordinate space setting section;
narrowing down a scope of coordinate space within the predetermined coordinate space, the scope including the first predetermined number of pieces of target information corresponding to the first predetermined number of target images to be displayed on the display section;
extracting the first predetermined number of pieces of target information corresponding to the first predetermined number of target images to be displayed on the display section for a purpose of narrowing down, among pieces of target information existing within the narrowed-down scope, and
repeating the identifying the coordinate of the target information, the narrowing down the scope of coordinate space and the extracting the first predetermined number of pieces of target information, at each time that the target image corresponding to the target information is selected by the instructing section, for displaying the first predetermined number of target images corresponding to the first predetermined number of pieces of target information by narrowing down the plurality of pieces of target information stored in the storage section to the first predetermined number of pieces of target information.

11. A computer program product tangibly embodying a program of instructions stored on a computer-readable storage medium making a searching device comprising a storage section for storing a plurality of pieces of target information concerning a target of a search, a display section capable of displaying first predetermined number of target images corresponding to each of first predetermined number of pieces of target information among the plurality of pieces of target information stored in the storage section, and an instructing section for performing an instruction so as to select a certain target image among the first predetermined number of target images displayed on the display section, execute: calculating feature information of each target information, the feature information indicating feature of each target information; setting a predetermined coordinate space based on the feature information calculated by the feature information calculating section; identifying a coordinate of target information corresponding to the target image selected by the instructing section, within the predetermined coordinate space set by the coordinate space setting section; narrowing down a scope of coordinate space within the predetermined coordinate space, the scope including the first predetermined number of pieces of target information corresponding to the first predetermined number of target images to be displayed on the display section; extracting the first predetermined number of pieces of target information corresponding to the first predetermined number of target images to be displayed on the display section for a purpose of narrowing down, among pieces of target information existing within the narrowed-down scope, and repeating the identifying the coordinate of the target information, the narrowing down the scope of coordinate space and the extracting the first predetermined number of pieces of target information, at each time that the target image corresponding to the target information is selected by the instructing section, for displaying the first predetermined number of target images corresponding to the first predetermined number of pieces of target information by narrowing down the plurality of pieces of target information stored in the storage section to the first predetermined number of pieces of target information.

* * * * *